United States Patent
Lee et al.

(10) Patent No.: US 11,791,457 B2
(45) Date of Patent: Oct. 17, 2023

(54) ANODE ACTIVE MATERIAL FOR LITHIUM SECONDARY BATTERY, METHOD OF PREPARING THE SAME, AND LITHIUM SECONDARY BATTERY CONTAINING THE SAME

(71) Applicant: SK ON CO., LTD., Seoul (KR)

(72) Inventors: Jee Hee Lee, Daejeon (KR); Joon Sup Kim, Daejeon (KR); Nam Hyung Kim, Ulsan (KR); Yeong Uk Son, Ulsan (KR); Yoon Kwang Lee, Ulsan (KR); Jae Phil Cho, Ulsan (KR)

(73) Assignees: SK ON CO., LTD, Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 117 days.

(21) Appl. No.: 17/158,503

(22) Filed: Jan. 26, 2021

(65) Prior Publication Data

US 2021/0151747 A1    May 20, 2021

Related U.S. Application Data

(63) Continuation of application No. 16/212,255, filed on Dec. 6, 2018, now Pat. No. 10,923,715.

(30) Foreign Application Priority Data

Dec. 7, 2017 (KR) .......................... 10-2017-0167486

(51) Int. Cl.
*H01M 4/36* (2006.01)
*H01M 4/38* (2006.01)
(Continued)

(52) U.S. Cl.
CPC ......... *H01M 4/366* (2013.01); *H01M 4/0428* (2013.01); *H01M 4/133* (2013.01);
(Continued)

(58) Field of Classification Search
CPC .......... H01M 4/36; H01M 4/38; H01M 4/587; H01M 4/1395; H01M 4/134; H01M 4/04
See application file for complete search history.

(56) References Cited

U.S. PATENT DOCUMENTS

| | | | |
|---|---|---|---|
| 2012/0229096 A1* | 9/2012 | Nazri | B82Y 30/00 29/623.5 |
| 2014/0050983 A1* | 2/2014 | Kim | H01M 4/366 429/211 |
| 2017/0110722 A1* | 4/2017 | Lee | H01M 4/364 |

FOREIGN PATENT DOCUMENTS

| | | |
|---|---|---|
| KR | 10-2006-0069738 A | 6/2006 |
| KR | 10-2015-0137946 A | 12/2015 |

(Continued)

OTHER PUBLICATIONS

Office Action for the Korean Patent Application No. 10-2017-0167486 issued by the Korean Patent Office dated Dec. 27, 2022.
(Continued)

*Primary Examiner* — Kenneth J Douyette
(74) *Attorney, Agent, or Firm* — IP & T GROUP LLP

(57) ABSTRACT

Provided are an anode active material for a lithium secondary battery, a method of preparing the same, and a lithium secondary battery containing the same. The present invention provides an anode active material for a lithium secondary battery including: a carbon based particle; a first carbon coating layer positioned on the carbon based particle and including pores; a silicon coating layer positioned on the pores and/or a pore-free surface of the first carbon coating layer; and second carbon coating layer positioned on the
(Continued)

silicon coating layer, a method of preparing the same, and a lithium secondary battery containing the same.

12 Claims, 2 Drawing Sheets

(51) Int. Cl.
| | |
|---|---|
| *H01M 4/58* | (2010.01) |
| *H01M 4/13* | (2010.01) |
| *H01M 4/04* | (2006.01) |
| *H01M 10/0525* | (2010.01) |
| *H01M 4/587* | (2010.01) |
| *H01M 4/1395* | (2010.01) |
| *H01M 4/134* | (2010.01) |
| *H01M 4/1393* | (2010.01) |
| *H01M 4/133* | (2010.01) |
| *H01M 4/02* | (2006.01) |

(52) U.S. Cl.
CPC ......... *H01M 4/134* (2013.01); *H01M 4/1393* (2013.01); *H01M 4/1395* (2013.01); *H01M 4/386* (2013.01); *H01M 4/587* (2013.01); *H01M 10/0525* (2013.01); *H01M 2004/021* (2013.01); *H01M 2004/027* (2013.01)

(56) References Cited

FOREIGN PATENT DOCUMENTS

| KR | 10-2016-0128279 A | 11/2016 |
|---|---|---|
| KR | 20170134134 A | 12/2017 |

OTHER PUBLICATIONS

Second Office Action on the Chinese Patent Application No. 201811476485.6 issued by the Chinese Patent Office dated Aug. 12, 2023.

\* cited by examiner

ANODE ACTIVE MATERIAL FOR LITHIUM SECONDARY BATTERY, METHOD OF PREPARING THE SAME, AND LITHIUM SECONDARY BATTERY CONTAINING THE SAME

CROSS-REFERENCE TO RELATED APPLICATIONS

This application is a continuation of U.S. patent Application Ser. No. 16/212,255 filed on Dec. 6, 2018, now U.S. Pat. No. 10,923,715 which claims benefits of priority of Korean Patent Application No. 10-2017-0167486 filed on Dec. 7, 2017. The disclosure of each of the foregoing application is incorporated herein by reference in its entirety.

TECHNICAL FIELD

The following disclosure relates to a lithium secondary battery, and more particularly, an anode active material for a lithium secondary battery, and a method of preparing the same, and a lithium secondary battery containing the same.

BACKGROUND

Recently, as the demand for electronic devices such as mobile devices, and the like, has increased, the development of a technology for the mobile devices has expanded. The demand for a lithium secondary battery such as a lithium battery, a lithium ion battery and a lithium ion polymer battery as a driving power source of these electronic devices has been significantly increased. In addition, as automobile fuel economy and exhaust gas-related regulations are being strengthened around the world, a market for electric vehicles is growing rapidly. Therefore, it is expected that the demand for mid- to large-sized secondary batteries such as secondary batteries for electric vehicles (EVs) and secondary batteries for energy storage devices (ESS) will be rapidly increased.

Meanwhile, as an anode material of a secondary battery, a carbon based anode material having excellent cycle characteristics and a theoretical capacity of 372 mAh/g has been generally used. However, gradually, secondary batteries such as mid- to large-sized secondary batteries have been required to have high capacity, inorganic anode materials such as silicon (Si), germanium (Ge), tin (Sn), antimony (Sb), or the like, capable of having a capacity of 500 mAh/g or more to replace the theoretical capacity of the carbon based anode material have been spotlighted. Among these inorganic anode materials, a silicon based anode material has significantly large lithium binding amount. However, the silicon based anode material may cause a significant volume change at the time of intercalation/deintercalation of lithium, that is, at the time of charging and discharging of a battery, and thus, pulverization may occur. As a result, pulverized particles may be aggregated, and thus, an anode active material may be electrically deintercalated from a current collector, which may cause a loss of reversible capacity during a long cycle. For this reason, there is a difficulty in practical use of the silicon based anode material and a secondary battery containing the same due to disadvantages of low cycle life characteristics and a low capacity retention rate, in spite of advantages depending on high charge capacity.

In order to solve the problems of the silicon based anode material as described above, research into a silicon based composite anode material such as a carbon/silicon composite, or the like, has been actively conducted. However, in the composite anode material, as an amount of silicon is increased, at the time of charging and discharging of a secondary battery, more severe volume expansion may occur. Therefore, as a new surface of silicon in the composite anode material is continuously exposed to an electrolyte, a solid electrolyte interface (SEI) layer is continuously formed and thus a thick side reaction layer is formed, thereby causing exhaustion of the electrolyte and an increase in battery resistance. Further, the thick side reaction layer as described above has a problem in that it affects graphite as well as silicon and causes an electric peel-off phenomenon between anode active material particles or from a current collector to rapidly deteriorate performance of the secondary battery such as cycle life characteristics, and the like.

Therefore, in order to commercialize a high-capacity silicon based composite anode material, there is a need to develop a technology capable of alleviating volume expansion caused by charging and discharging of a secondary battery to prevent performance of the secondary battery from being deteriorated, while increasing a content of silicon for high capacity.

SUMMARY

An embodiment of the present invention is directed to providing an anode active material for a lithium secondary battery having high capacity and long cycle life characteristics by alleviating volume expansion caused by charging and discharging of a secondary battery.

Another embodiment of the present invention is directed to providing a method of preparing an anode active material for a lithium secondary battery capable of depositing a large amount of silicon on graphite particles with a thin thickness to allow the anode active material to have a high capacity and alleviate volume expansion caused by charging and discharging of a secondary battery.

Another embodiment of the present invention is directed to providing a lithium secondary battery containing an anode active material for a lithium secondary battery having advantages described above.

In one general aspect, an anode active material for a lithium secondary battery includes: a carbon based particle; a first carbon coating layer positioned on the carbon based particle and including pores; a silicon coating layer positioned on the pores and/or a pore-free surface of the first carbon coating layer; and a second carbon coating layer positioned on the silicon coating layer.

The first carbon coating layer may include the pores in the inside and a surface thereof.

An average pore size of the pores of the first carbon coating layer may be 30 nm or more to 900 nm or less.

The anode active material may satisfy the following Equation 1:

$$0.005 \leq D_a/D_b \leq 0.02 \quad \text{[Equation 1]}$$

in Equation 1, $D_a$ is the average pore size of the pores of the first carbon coating layer, and $D_b$ is the average particle size of the carbon based particles.

A specific surface area when the first carbon coating layer is formed on the carbon based particle may be increased by over 43% as compared to a specific surface area of only the carbon based particle.

A thickness of the silicon coating layer may be 10 nm or more to 100 nm or less.

The silicon coating layer may be formed by a chemical vapor deposition (CVD) method.

The anode active material may contain 30 wt % or more to 80 wt % or less of the carbon based particle, 5 wt % or more to 30 wt % or less of the first carbon coating layer, 5 wt % or more to 40 wt % or less of the silicon coating layer, and 5 wt % or more to 30 wt % or less of the second carbon coating layer based on a total weight of the anode active material.

In another general aspect, a method of preparing an anode active material for a lithium secondary battery includes: (a) mixing and stirring carbon based particles, ceramic particles for forming a pore, and a first carbon precursor with each other; (b) forming a first carbon coating layer including pores on the carbon based particles by mixing a ceramic particle etching solution for forming a pore; (c) forming a silicon coating layer on the pores and/or a pore-free surface of the first carbon coating layer by a chemical vapor deposition (CVD) method; (d) mixing and stirring a second carbon precursor; and (e) performing sintering.

In step (b), the pores may be formed in the inside and a surface of the first carbon coating layer.

An average particle size of the ceramic particles for forming a pore may be 30 nm or more to 900 nm or less.

The anode active material may satisfy the following Equation 1:

$$0.005 \leq D_a/D_b \leq 0.02 \quad \text{[Equation 1]}$$

in Equation 1, $D_a$ is the average pore size of the pores of the first carbon coating layer, and $D_b$ is the average particle size of the carbon based particles.

In step (c), the silicon coating layer may be deposited with a thickness of 10 nm or more to 100 nm or less.

The method may further include, between step (a) and step (b), (a-1) performing sintering.

A sintering temperature in step (a-1) and/or step (e) may be 600° C. or more to 1000° C. or less.

At the time of stirring in step (a) and/or step (d), a solvent may be sprayed.

In another general aspect, a lithium secondary battery containing the anode active material described above.

DETAILED DESCRIPTION OF EMBODIMENTS

Figure 1:
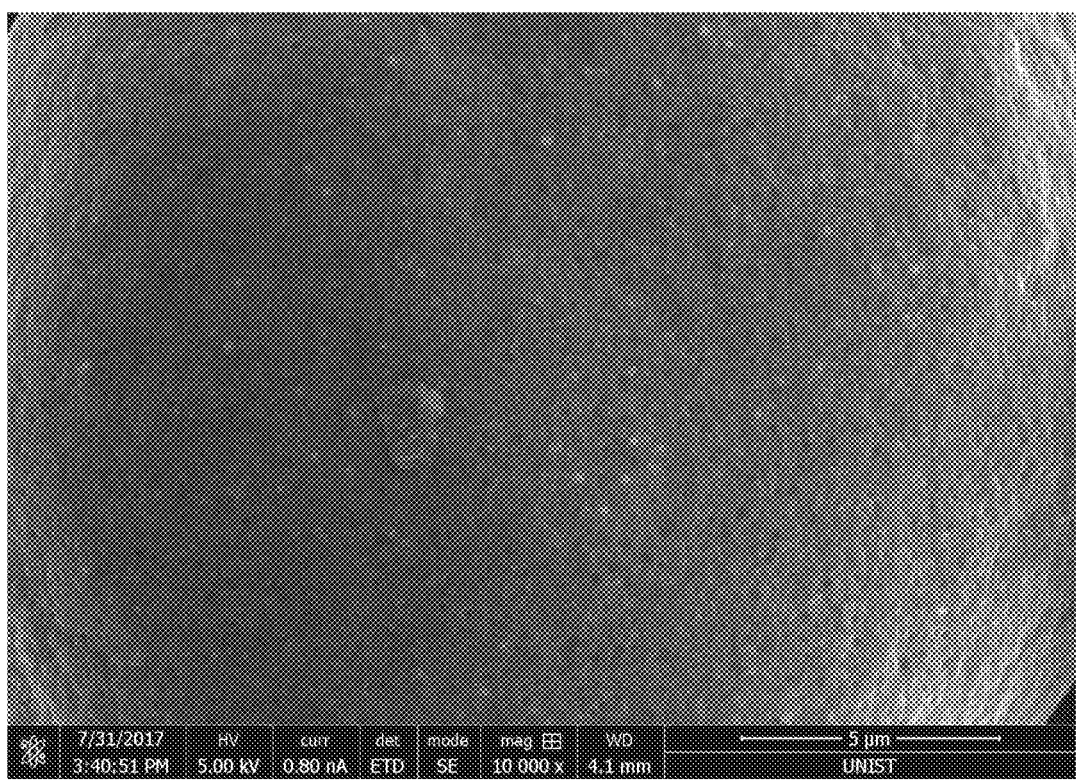
FIG. 1 is a scanning electron microscope photograph of an anode active material prepared in Example 1.

Unless otherwise defined, all terms (technical terms and scientific terms) used in the present specification have the general meaning understood by those skilled in the art to which the present invention pertains. Unless explicitly described to the contrary, a singular form includes a plural form in the present specification.

Throughout the specification, when an element such as a layer, a film, a region, or a substrate is referred to as being "on" or "above" another element, it may be directly on another element or may have an intervening element present therebetween.

In addition, throughout the specification, the term "above" or "on" does not necessarily mean that any element is positioned at an upper side based on a gravity direction, but means that any element is positioned above or below a target portion.

As described above, it is expected that the demand for mid- to large-sized secondary batteries such as secondary batteries for electric vehicles (EVs), secondary batteries for energy storage devices (ESS) will be rapidly increased. Therefore, the necessity of development of a high capacity secondary battery has increased, and as a part thereof, in order to commercialize a high-capacity silicon based composite anode material exhibiting high capacity characteristics, there is a need to develop a technology capable of alleviating volume expansion caused by charging and discharging of a secondary battery to prevent performance of the secondary battery from being deteriorated, while increasing a content of silicon for high capacity.

The present invention relates to an anode active material for a lithium secondary battery capable of implementing high capacity by increasing a content of silicon as compared to an anode active material for a secondary battery known in the art, effectively preventing an electrical isolation and delamination phenomenon due to volume expansion of the silicon coating layer caused by charging and discharging of a secondary battery, and suppressing side reactions with the electrolyte and exhaustion of the electrolyte by blocking a silicon interface from being directly exposed to an electrolyte to thereby implement excellent cycle life characteristics of the secondary battery.

More specifically, an aspect of the present invention provides an anode active material for a lithium secondary battery including a carbon based particle, a first carbon coating layer positioned on the carbon based particles and including pores, a silicon coating layer positioned on the pores of the first carbon coating layer and/or a pore-free surface of the first carbon coating layer, and a second carbon coating layer.

In the anode active material according to the aspect of the present invention, a porous first carbon coating layer including the pores is positioned on the carbon based particle, and the silicon coating layer is position on the pores of the first carbon coating layer and/or the pore-free surface of the first carbon coating layer, such that the silicon coating layer may be thinly positioned on the first carbon coating layer having a wide surface area, and thus the anode active material may contain a large amount of silicon. Therefore, capacity of the anode active material may be increased, and stress due to volume expansion of the silicon coating layer caused by charging and discharging of the lithium secondary battery may be decreased. Therefore, a problem such as an electric peeling off phenomenon of silicon from a current collector, or the like, may be alleviated, and excellent cycle life characteristics may be implemented.

Further, as the second carbon coating layer is positioned on the silicon coating layer, it is possible to minimize direct exposure of silicon to an electrolyte to decrease a side reaction of the electrolyte, and it is also possible to alleviate volume expansion at the time of charging and discharging of a secondary battery to improve cycle life characteristics of a lithium secondary battery.

The silicon coating layer in the anode active material for a lithium secondary battery according to the aspect of the present invention may be formed by a chemical vapor deposition (CVD) method.

In the case of directly forming a silicon coating layer on carbon based particles or a first carbon coating layer in which pores are not present by the chemical vapor deposition (CVD) method, since a thickness of the silicon coating layer cannot but to be thickened in order to coat a desired amount of silicon, there was a big problem such as stress due to volume expansion of the silicon coating layer caused by charge and discharge of the lithium secondary battery.

The anode active material for a lithium secondary battery according to the aspect of the present invention, containing the porous first carbon coating layer may solve the problem in the related art. More specifically, it is possible to coat a large amount of silicon with a thin thickness while using the chemical vapor deposition (CVD) method which is advantageous for uniform coating of the silicon coating layer. Therefore, in the anode active material for a lithium secondary battery according to the aspect of the present invention, since a large amount of silicon may be uniformly and thinly coated, capacity may be increased, and stress due to volume expansion of the silicon coating layer caused by charging and discharging of the lithium secondary battery may be decreased. As a result, excellent cycle life characteristics of the lithium secondary battery may be implemented.

Specifically, the first carbon coating layer including the pores may include the pores in the inside and in a surface thereof. The first carbon coating layer includes the pores in the inside as well as the surface thereof, and the silicon is deposited on the inside, surface pores and the pore-free surface of the first carbon coating layer, the anode active material for a lithium secondary battery according to the aspect of the present invention may contain a large amount of silicon with a thin thickness. A coating form as described above may be confirmed through a scanning electron microscope photograph in an Example to be described below.

Further, the silicon coating layer is positioned on the pores in the inside of the first carbon coating layer, such that in spite of volume expansion of the silicon coating layer caused by charging and discharging of the lithium secondary battery and partial delamination of silicon, silicon is not lost but may remain in spaces in internal pores, and a contact with the electrolyte may be prevented. Therefore, even though charge and discharge are repeated, high capacity may be maintained.

An average pore size of the pores in the first carbon coating layer may be 30 nm or more to 900 nm or less. However, the present invention is not limited thereto. More specifically, the average pore size may be 50 nm or more to 700 nm or less, 50 nm or more to 600 nm or less, 50 nm or more to 500 nm or less, 100 nm or more to 400 nm or less, 150 nm or more to 350 nm or less, or 200 nm or more to 300 nm or less. In this case, cycle life characteristics of the lithium secondary battery may be more excellent.

The reason is as follows. When the average pore size of the pores of the first carbon coating layer is relatively small, a ratio of the silicon coating layer filling in an internal space of the first carbon coating layer is increased, such that an effect of decreasing stress caused by charging and discharging is relatively small, and thus, a capacity loss may be partially generated due to volume expansion and delamination. Meanwhile, when the average pore size of the pores of the first carbon coating layer is relatively large, there is a portion in which the silicon coating layer is not firmly coated on the surface of the first carbon coating layer, such that a capacity loss may be partially generated due to volume expansion caused by charging and discharging and a loss of silicon caused by delamination.

The anode active material for a lithium secondary battery according to the aspect of the present invention may satisfy the following Equation 1. However, the present invention is not limited thereto.

$$0.005 \leq D_a/D_b \leq 0.02 \quad \text{[Equation 1]}$$

In Equation 1, $D_a$ is the average pore size of the pores of the first carbon coating layer, and $D_b$ is an average particle size of the carbon based particles.

A lower limit of $D_a/D_b$ in Equation 1 may be 0.0075 or 0.01, and an upper limit thereof may be specifically 0.0175 or 0.015. In this case, cycle life characteristics of the lithium secondary battery may be more excellent.

In the anode active material for a lithium secondary battery according to the aspect of the present invention, a specific surface area when the first carbon coating layer is formed on the carbon based particles is increased by over 43' as compared to a specific surface area of only the carbon based particles measured by a BET analyzer (model name: TriStar II, manufactured by Micromeritics). More specifically, the specific surface area may be increased by 50% or more to 200% or less, 50% or more to 150% or less, 54% or more to 150% or less, 104% or more to 150% or less, or 80% or more to 120% or less. However, the present invention is not necessarily limited thereto.

This result is due to the first carbon coating layer including the pores as in the anode active material according to the aspect of the present invention. As proved in the Example to be described below, a coating surface area of silicon coating layer may be significantly increased as compared to the case in which the first carbon coating layer does not include pores.

Therefore, a large amount of silicon may be thinly and uniformly coated on the first carbon coating layer, such that capacity may be increased as compared to a carbon based material, and stress due to volume expansion of the silicon coating layer caused by charging and discharging of the lithium secondary battery may be decreased. As a result, excellent cycle life characteristics of the lithium secondary battery may be implemented.

The anode active material for a lithium secondary battery according to the aspect of the present invention may contain 30 wt % or more to 80 wt % or less of the carbon based particles, 5 wt % or more to 30 wt % or less of the first carbon coating layer, 5 wt % or more to 40 wt % or less of the silicon coating layer, and 5 wt % or more to 30 wt % or less of the second carbon coating layer based on a total weight of the anode active material, but is not particularly limited thereto.

A thickness of the silicon coating layer of the anode active material for a lithium secondary battery according to the aspect is not particularly limited, but may be 10 nm or more to 100 nm or less. More specifically, the thickness of the silicon coating layer may be 10 nm or more to 80 nm or less, 10 nm or more to 50 nm or less, 10 nm or more to 40 nm or less, or 10 nm or more to 30 nm or less.

This range may be a result of including the porous first carbon coating layer so that a large amount of silicon may be coated with a thin thickness. Therefore, as a large amount of silicon may be thinly coated on the surface of the first carbon coating layer, excellent capacity characteristics and cycle life characteristics may be implemented.

Meanwhile, boundaries between the carbon based particle, the first carbon coating layer, the silicon coating layer, and the second carbon coating layer may be confirmed through a cross-sectional scanning electron microscope (SEM) photograph, and a thickness of each of the layers may be measured therefrom.

A thickness of the first carbon coating layer of the anode active material for a lithium secondary battery according to the aspect of the present invention is not particularly limited, but may be 0.01 μm or more to 10 μm or less, specifically, 0.1 μm or more to 5 μm or less, and more specifically, 0.2

μm or more to 1 μm or less. The thickness of the first carbon coating layer is in the above-mentioned range, such that sufficient pores may be formed therein, and thus, the specific surface area thereof may be increased.

A thickness of the second carbon coating layer of the anode active material for a lithium secondary battery according to the aspect of the present invention is not particularly limited, but may be 0.01 μm or more to 10 μm or less, specifically, 0.1 μm or more to 5 μm or less, and more specifically, 0.1 μm or more to 1 μm or less. The second carbon coating layer has the above-mentioned thickness, thereby making it possible to prevent the silicon coating layer from coming in direct contact with the electrolyte.

The carbon based particles of the anode active material according to the aspect of the present invention may be, for example, crystalline carbon based particles, and more specifically, graphite particles, but are not limited thereto.

An average particle size of the carbon based particles of the anode active material according to the aspect of the present invention may be 1 μm or more to 100 μm or less, specifically, 3 μm or more to 40 μm or less, and more specifically, 5 μm or more to 20 μm or less, but is not particularly limited thereto.

Meanwhile, as used herein, the term "average particle size" means a value measured as a volume average value D50 (that is, a particle size when a cumulative volume is 50%) in particle size distribution measurement by a laser light diffraction method.

Another aspect of the present invention provides a method of preparing an anode active material for a lithium secondary battery including: (a) mixing and stirring carbon based particles, ceramic particles for forming a pore, and a first carbon precursor with each other; (b) forming a first carbon coating layer including pores on the carbon based particles by mixing a ceramic particle etching solution for forming a pore; (c) forming a silicon coating layer on the pores and/or a pore-free surface of the first carbon coating layer by a chemical vapor deposition (CVD) method; (d) mixing and stirring a second carbon precursor; and (e) performing sintering.

This method is a method capable of preparing the anode active material according to the aspect of the present invention. Further, the method has an advantage in that the anode active material according to the present invention may be mass-produced through a significantly simple process by mixing and stirring the carbon based particles, silicon particles; and the carbon precursors. Further, it is possible to coat a large amount of silicon with a thin thickness even while using the CVD method which is advantageous for uniform coating of a silicon coating layer. Therefore, capacity of the anode active material may be increased, and stress due to volume expansion of the silicon coating layer caused by charging and discharging of a lithium secondary battery may be decreased, such that high capacity and excellent cycle life characteristics of the lithium secondary battery may be implemented.

Hereinafter, the method of preparing an anode active material is described in more detail. A description of the above-mentioned contents of the material such as the kind of carbon based particle, the average particle size thereof, and the like, will be omitted.

First, in step (a), the carbon based particles, the ceramic particles for forming a pore, and the first carbon precursor are mixed and stirred with each other. In this step, a first precursor in which the ceramic particles for forming a pore are dispersed in the inside and/or on a surface of the first carbon precursor on the carbon based particles may be obtained.

In this step, an organic solvent may be sprayed in order to more uniformly disperse the carbon based particles, the ceramic particles for forming a pore, and the first carbon precursor at the time of stirring. The first precursor may be obtained by spraying a small amount of the organic solvent to perform the stirring in a high-viscosity solution state. In this case, as dispersibility is improved, the ceramic particles for forming a pore may be further dispersed and positioned in the first carbon precursor, such that pores may be more uniformly formed in the first carbon coating layer in a subsequent process. The organic solvent may be, for example, tetrahydrofuran (THF), but is not limited thereto.

A stirring method may be a mechanical stirring method, and be performed by a particle mixer. The particle mixer is not particularly limited, but may be a rotating stirrer, a revolution stirrer, a blade mixer, or a particle fusion device.

The first carbon precursor may be a carbon precursor selected from the group consisting of pitch based carbon precursors, PAN based carbon precursors, rayon based carbon precursors, and a combination thereof, but is not limited thereto.

Thereafter, in step (b), a second precursor may be obtained by mixing the ceramic particle etching solution for forming a pore to form the first carbon coating layer including pores on the carbon based particles.

In this step, the ceramic particles for forming a pore, dispersed in the inside and/or on the surface of the first carbon precursor on the carbon based particles are etched by the etching solution, such that the pores may be formed in the inside and/or the surface of the first carbon precursor. Therefore, it may be possible to form the first carbon coating layer having a high specific surface area, and it may be possible to deposit a large amount of silicon with a thin thickness through chemical vapor deposition corresponding to a subsequent process.

Materials of the ceramic particles for forming a pore and the etching solution for forming a pore are not particular limited, but any ceramic particle and any etching solution may be used without limitations as long as the ceramic particles may be etched by the etching solution. As a non-restrictive example, the ceramic particles for forming a pore, silica ($SiO_2$) may be used, and as the etching solution, a sodium hydroxide (NaOH) solution may be used.

An average particle size of the ceramic particles for forming a pore may be 30 nm or more to 900 nm or less. However, the present invention is not limited thereto. More specifically, the average particle size of the ceramic particles may be 50 nm or more to 700 nm or less, 50 nm or more to 600 nm or less, 50 nm or more to 500 nm or less, 100 nm or more to 400 nm or less, 150 nm or more to 350 nm or less, or 200 nm or more to 300 nm or less. In this case, cycle life characteristics of a lithium secondary battery using the prepared anode active material may be more excellent.

Further, an average pore size of the pores of the first carbon coating layer formed in step (b) and the average particle size of the carbon based particles may satisfy the following Equation 1. However, as described above, the present invention is not necessarily limited thereto.

$$0.005 \leq D_a/D_b \leq 0.02 \qquad \text{[Equation 1]}$$

In Equation 1, $D_a$ is the average pore size of the pores of the first carbon coating layer, and $D_b$ is the average particle size of the carbon based particles.

A lower limit of $D_d/D_b$ in Equation 1 may be more specifically 0.0075 or 0.01, and an upper limit thereof may be more specifically 0.0175 or 0.015. In this case, cycle life characteristics of the lithium secondary battery may be more excellent.

Further, the method may further include, between step (a) and step (b), (a-1) performing sintering. The sintering in step (a-1) may be performed under an inert atmosphere. For example, the sintering may be performed under an argon (Ar), helium (He), or nitrogen ($N_2$) atmosphere. However, the present invention is not limited thereto. In addition, a sintering temperature in the sintering in step (a-1) is not particularly limited, but may be 600° C. or more to 1000° C. or less. A sintering pressure and a sintering time may be appropriately adjusted depending on the purpose and are not limited to specific ranges.

Then, in step (c), a third precursor may be obtained by forming the silicon coating layer on the pores and/or the pore-free surface of the first carbon coating layer through chemical vapor deposition. Through this step, it is possible to coat a large amount of silicon with a thin thickness even while using the CVD method which is advantageous for uniform coating of a silicon coating layer. Therefore, a large amount of silicon may be thinly and uniformly coated on the porous first carbon coating layer, such that capacity may be increased, and stress due to volume expansion of the silicon coating layer caused by charging and discharging of the lithium secondary battery may be decreased. As a result, excellent cycle life characteristics of the lithium secondary battery may be implemented.

In this step, as a silicon precursor, silane ($SiH_4$) gas may be used, but the silicon precursor is not necessarily limited thereto.

Further, an introduction speed and a deposition time of a silicon precursor gas are not limited to specific ranges.

As an example, in step (c), the silicon coating layer may be deposited with a thickness of 10 nm or more to 100 nm or less. More specifically, the silicon coating layer may be deposited with a thickness of 10 nm or more to 80 nm or less, 10 nm or more to 50 nm or less, 10 nm or more to 40 nm or less, or 10 nm or more to 30 nm or less.

This range may be a result of including the porous first carbon coating layer so that a large amount of silicon may be coated with a thin thickness. Therefore, as a large amount of silicon may be thinly coated on the surface of the first carbon coating layer, excellent capacity characteristics and cycle life characteristics may be implemented.

Next, in step (d), the second carbon precursor is mixed and stirred. The second carbon precursor is positioned on the deposited silicon coating layer through this step. Therefore, it is possible to allow silicon not to be exposed to a surface by covering the silicon coating layer with the second carbon precursor. As a result, silicon particles exposed to a surface of a finally prepared anode active material is significantly decreased, such that it is possible to block silicon from being directly exposed to the electrolyte, thereby making it possible to improve cycle life characteristics.

A stirring method in this step may be a mechanical stirring method, and be performed by a particle mixer. The particle mixer is not particularly limited, but may be a rotating stirrer, a revolution stirrer, a blade mixer, or a particle fusion device.

The second carbon precursor may be a carbon precursor selected from the group consisting of pitch based carbon precursors, PAN based carbon precursors, rayon based carbon precursors, and a combination thereof, but is not limited thereto.

Further, the first carbon precursor in step (a) and the second carbon precursor in step (d) may also be the same as or different from each other.

In this step, an organic solvent may be sprayed for smoother dispersion at the time of stirring. In this case, compactness of the carbon coating layer formed from the second carbon precursor may be improved through smoother dispersion, and it is possible to expect improvement of battery characteristics.

Meanwhile, in the method of preparing an anode active material according to the aspect of the present invention, although not particularly limited, but the carbon based particles, the first carbon precursor, and the second carbon precursor may be mixed and silicon may be deposited at mixing amounts and a deposition amount so that an anode active material to be finally prepared contains 30 wt % or more to 80 wt % or less of the carbon based particles, 5 wt % or more to 30 wt % or less of the first carbon coating layer, 5 wt % or more to 40 wt % or less of the silicon coating layer, and 5 wt % or more to 30 wt % or less of the second carbon coating layer based on a total weight of the anode active material.

Thereafter, in step (e) the sintering is performed. This step is a step of finally preparing the anode active material by carbonizing the second carbon precursor through thermal treatment of a material in which the second carbon precursor is positioned on the third precursor obtained through the above-mentioned preparation steps.

The sintering in step (e) may be performed under an inert atmosphere. For example, the sintering may be performed under an argon (Ar), helium (He), or nitrogen ($N_2$) atmosphere. However, the present invention is not limited thereto. In addition, a sintering temperature in the sintering in step (e) is not particularly limited, but may be 600° C. or more to 1000° C. or less. A pressure and a sintering time in the sintering in step (e) are not particularly limited.

Another aspect of the present invention provides a lithium secondary battery containing the anode active material according to the aspect of the present invention described above.

The lithium secondary battery is a lithium secondary battery capable of securing stability even in the case of repeating charge and discharge, alleviating volume expansion, and having improved battery characteristics such as high capacity and excellent cycle life characteristics by containing the anode active material having the features described above in an anode.

Here, the lithium secondary battery may further include a cathode and an electrolyte, and further include a separator between the cathode and the anode.

The lithium secondary battery according to the present invention may be classified into a lithium ion battery, a lithium ion polymer battery, and a lithium polymer battery depending on the kinds of separator and electrolyte used therein, classified into a cylindrical battery, a prismatic battery, a coin type battery, a pouch type battery, and the like, depending on a shape thereof, and classified into a bulk type battery and a thin film type battery depending on a size thereof. Since structures of these batteries and method of manufacturing these batteries are widely known in the art, a minimum description will be added.

First, the anode includes a current collector and an anode active material layer formed on the current collector, and the anode active material layer may contain the anode active material according to the aspect of the present invention. Since a description of the anode active material is as described above, the description thereof will be omitted.

Further, the anode active material layer may further contain an anode binder and may selectively further contain a conductive material.

The anode binder may serve to allow anode active material particles to adhere well to each other and allow the anode active material to adhere well to the current collector. As the binder, a water-insoluble binder, a water-soluble binder, or a combination thereof may be used.

Examples of the water-insoluble binder may include polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, polyamideimide, polyimide, or a combination thereof.

Examples of the water-soluble binder may include styrene-butadiene rubber, acrylated styrene-butadiene rubber, polyvinyl alcohol, sodium polyacrylate, a copolymer of propylene and an olefin having 2 to 6 carbon atoms, a copolymer of (meth)acrylic acid and (meth)acrylic acid alkyl ester, or a combination thereof.

In the case of using the water-soluble binder as the anode binder, the anode binder may further contain a cellulose based compound capable of imparting viscosity. As the cellulose based compound, a mixture of one or more of carboxymethyl cellulose, hydroxypropylmethyl cellulose, methyl cellulose, or alkali metal salts thereof may be used. As the alkali metal, Na, K, or Li may be used. A used amount of this thickening agent may be 0.1 to 3 parts by weight based on 100 parts by weight of the binder.

In addition, the conductive material is used in order to impart conductivity to an electrode and any conductive material may be used as long as it does not cause chemical changes in a battery to be configured and has electronic conductivity. As an example, a carbon based material such as natural graphite, artificial graphite, carbon black, acetylene black, ketjen black, carbon fiber, or the like; a metal based material such as metal powder or metal fiber of copper, nickel, aluminum, silver, or the like; a conductive polymer such as a polyphenylene derivative, or the like; or a conductive material containing a mixture thereof may be used.

Further, as the current collector, a current collect selected from the group consisting of copper foil, nickel foil, stainless steel foil, titanium foil, nickel foam, copper foam, a polymer substrate coated with a conductive metal, and a combination thereof may be used.

Meanwhile, the cathode includes a current collector and a cathode active material layer formed on the current collector. As a cathode active material, a compound capable of reversibly intercalating and deintercalating lithium (a lithiated intercalation compound) may be used. Specifically, one or more of composite oxides of lithium and a metal selected from cobalt, manganese, nickel and a combination thereof may be used. As a specific example of the cathode active material, a compound represented by any one of the following Chemical Formulas may be used:

$Li_aA_{1-b}X_bD_2$ ($0.90 \leq a \leq 1.8$ and $0 \leq b \leq 0.5$); $Li_aA_{1-b}X_bO_{2-c}D_c$ ($0.90 \leq a \leq 1.8$, $0 \leq b \leq 0.5$, and $0 \leq c \leq 0.05$); $LiE_{1-b}X_bO_{2-c}D_c$ ($0 \leq b \leq 0.5$ and $0 \leq c \leq 0.05$); $LiE_{2-b}X_bO_{4-c}D_c$ ($0 \leq b \leq 50.5$ and $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.05$, and $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, and $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, and $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, and $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, and $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, and $0 \leq \alpha \leq 2$); $Li_aNi_bE_cG_dO_2$ ($0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2GbO_4$ ($0.90 \leq a \leq 1.8$ and $0.001 \leq b \leq 0.1$); $Li_aMnG_bPO_4$ ($0.90 \leq a \leq 1.8$ and $0.001 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the Chemical Formulas, A is selected from the group consisting of Ni, Co, Mn, and a combination thereof; X is selected from the group consisting of Al, Ni, Co, Mn, Cr, Fe, Mg, Sr, V, rare earth elements, and a combination thereof; D is selected from the group consisting of O, F, S, P, and a combination thereof; E is selected from the group consisting of Co, Mn, and a combination thereof; T is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof.

Of course, a cathode active material having a coating layer on a surface of the compound described above may be used, or a mixture of the compound and a compound having a coating layer may also be used. The coating layer may contain at least one coating element compound selected from the group consisting of oxides, hydroxides, oxyhydroxides, oxycarbonates, and hydroxycarbonates of a coating element. The compound constituting these coating layers may be amorphous or crystalline. As the coating element contained in the coating layer, Mg, Al, Co, K, Na, Ca, Si, Ti, V, Sn, Ge, Ga, B, As, Zr, or a mixture thereof may be used. In a process of forming the coating layer, any coating method (for example, a spray coating method, a dipping method, or the like) may be used as long as the method may coat the compound using the elements described above without a negative influence on physical properties of the cathode active material. This is well understood by those skilled in the art, a detailed description thereof will be omitted.

The cathode active material layer may further contain a cathode binder and a conductive material.

The binder serves to allow cathode active material particles to adhere well to each other and allow the cathode active material to adhere well to the current collector. As a representative example thereof, polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, nylon, or the like, may be used, but the binder is not limited thereto.

The conductive material is used in order to impart conductivity to an electrode and any conductive material may be used as long as it does not cause chemical changes in a battery to be configured and has electronic conductivity. As an example, natural graphite, artificial graphite, carbon black, acetylene black, ketjen black, carbon fiber, metal powder or metal fiber made of copper, nickel, aluminum, silver, or the like may be used. In addition, one or a mixture of one or more of conductive materials such as polyphenylene derivatives may be used.

In addition, as the current collector, Al may be used, but the current collector is not limited thereto.

The anode and the cathode may be manufactured by mixing active materials, the conductive material, and the binder in a solvent to prepare active material compositions and applying the composition on the current collectors, respectively. Since a method of manufacturing an electrode as described above is well-known in the art, a detailed description thereof will be omitted in the present specification. As the solvent, N-methylpyrrolidone, or the like, may be used, but the solvent is not limited thereto.

Meanwhile, the lithium secondary battery may be a non-aqueous electrolyte secondary battery, wherein a non-aqueous electrolyte may contain a non-aqueous organic solvent and a lithium salt.

The non-aqueous organic solvent serves as a medium in which ions participating in electrochemical reactions of the battery may move.

Further, as described above, the separator may be present between the cathode and the anode. As a separator, a film of polyethylene, polypropylene, polyvinylidene fluoride, or a multilayer film composed of two or more layers thereof may be used, and a mixed multilayer separator such as a polyethylene/polypropylene double layer separator, a polyethylene/polypropylene/polyethylene triple layer separator, polypropylene/polyethylene/polypropylene triple layer separator, and the like, may also be used.

Hereinafter, preferable Examples and Comparative Examples of the present invention will be described. However, the following Example is only a preferable example of the present invention, and the present invention is not limited thereto.

Evaluation Method (1) Measurement of Initial Discharge Capacity

A battery was charged by applying a constant current of 0.1 C rate at 25° C. until a voltage of the battery reached 0.01 V (vs. Li), and when the voltage of the battery reached 0.01 V (vs. Li), a current voltage was applied to charge the battery until the current reached 0.01 C rate. At the time of discharging, the battery was discharged at a constant current of 0.1 C rate until the voltage reached to 1.5 V (vs. Li).

(2) Evaluation of Cycle Life Characteristics

A battery was charged by applying a constant current of 0.5 C rate at 25° C. until a voltage of the battery reached 0.01 V (vs. Li), and when the voltage of the battery reached 0.01 V (vs. Li), a current voltage was applied to charge the battery until the current reached 0.01 C rate. A cycle of discharging the battery at a constant current of 0.5 C rate until the voltage reached to 1.5 V (vs. Li) at the time of discharge was repeated 50 times.

Example 1

After dispersing 20 wt % of silica ($SiO_2$) particles having an average particle size of 250 nm, 70 wt % of graphite particles having an average particle size of 20 μm, and 10 wt % of pitch (viscosity at 25° C.: ≥$10^5$ cP) without a solvent, a first precursor in which the silica particles are positioned on the graphite particles in a dispersed state in the inside and on a surface of the pitch was obtained by mechanical stirring.

The first precursor was sintered at 900° C. for 1 hour under a nitrogen ($N_2$) atmosphere and mixed and stirred with a 1M NaOH solution for 1 hour, thereby etching the silica particles. Thereafter, the remaining NaOH was removed by centrifugation and washing, thereby obtaining a second precursor in which a first carbon coating layer including pores in the inside and a surface thereof is positioned on the graphite particles.

Chemical deposition of $SiH_4$ (g) was performed at a rate of 50 sccm on the second precursor at 600° C. for 1 hour under an inert ($N_2$) atmosphere to form a silicon coating layer through a chemical vapor deposition method, thereby obtaining a third precursor.

10 parts by weight of pitch was mixed with the third precursor based on 100 parts by weight of the entire first precursor, and the mixture was sintered at 700° C. for 1 hour under a nitrogen ($N_2$) atmosphere, thereby finally obtaining an anode active material.

The obtained anode active material had a structure having a first coating layer including pores in the inside and the surface thereof and positioned on the graphite particle, the silicon coating layer positioned on the inside and surface pores and/or a pore-free surface of the first carbon coating layer, surface pores, and the second carbon coating layer enclosing the silicon coating layer.

It was confirmed that components of the anode active material were 77 wt % of the graphite, 9 wt % of the first carbon coating layer, 8 wt % of the silicon coating layer, and 6 wt % of the second carbon coating layer based on a total weight of the prepared anode active material.

FIG. 1 is a scanning electron microscope photograph (model name: Verios 460, manufactured by FEI) of the prepared anode active material. It may be confirmed that there was no silicon particles exposed to a surface of the anode active material due to the second carbon coating layer positioned in an outermost portion.

Figure 2:
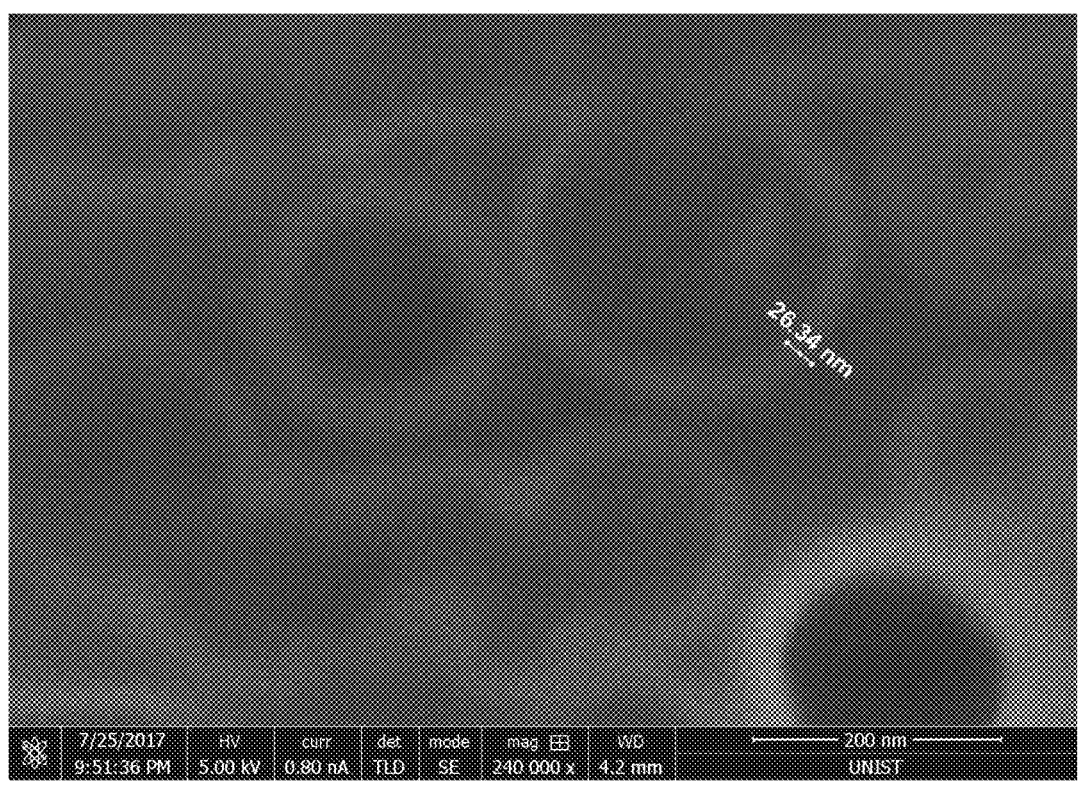
FIG. 2 is a scanning electron microscope photograph of a cross section of a portion of the anode active material prepared in Example 1 in which a first carbon coating layer and a silicon coating layer are positioned.

FIG. 2 is a scanning electron microscope photograph of a cross section of a portion of the prepared anode active material in which the first carbon coating layer and the silicon coating layer are positioned. It may be confirmed that the silicon coating layer was formed with a thickness of 26 nm on the inside pores, the surface pores, and the pore-free surface of the first carbon coating layer having the pores in the inside and the surface thereof.

Example 2

An anode active material was prepared in the same method as in Example 1 except for using silica particles having an average particle size of 150 nm.

Example 3

An anode active material was prepared in the same method as in Example 1 except for using silica particles having an average particle size of 350 nm.

Comparative Example 1

Chemical deposition of $SiH_4$ (g) was performed at a rate of 50 sccm on graphite particles having an average particle size of 20 μm at 600° C. for 1 hour under an inert ($N_2$) atmosphere, thereby forming a silicon coating layer through a chemical vapor deposition method.

Thereafter, 10 parts by weight of pitch was mixed with the resultant based on 100 parts by weight of the entire graphite particles, and the mixture was sintered at 900° C. for 1 hour under a nitrogen ($N_2$) atmosphere, thereby finally obtaining an anode active material.

The obtained anode active material had a structure in which the silicon coating layer was positioned on the graphite particles and a carbon coating layer was positioned on the silicon coating layer.

It was confirmed that components of the anode active material were 86 wt % of the graphite, 8 wt % of the silicon coating layer, and 6 wt, of the carbon coating layer based on a total weight of the prepared anode active material.

Comparative Example 2

When a temperature of the graphite particles having an average particle size of 20 μm was raised at 5° C./min from room temperature under an inert ($N_2$) atmosphere to reach to 900° C., ethylene ($C_2H_2$) gas was flowed thereto at 1.5 L/min for 30 minutes.

Thereafter, chemical deposition of $SiH_4$ (g) was performed at a rate of 50 sccm thereon for 1 hour, thereby forming a silicon coating layer on a carbon coating layer through a chemical vapor deposition method.

Next, $C_2H_2$ gas was pyrolyzed at a rate of 1.5 L/min at a temperature of 900° C., thereby preparing an anode active material in which a carbon layer was coated on the silicon coating layer.

The obtained anode active material had a structure in which a first carbon coating layer having no pores was positioned on the graphite particles, the silicon coating layer was positioned on the first carbon coating layer, and a second carbon coating layer was positioned on the silicon coating layer.

It was confirmed that components of the anode active material were 87 wt % of the graphite, 3 wt % of the first carbon coating layer, 8 wt % of the silicon coating layer, and 2 wt % of the second carbon coating layer based on a total weight of the prepared anode active material.

Examples 4 to 6 and Comparative Examples 3 and 4

Each of the anode materials prepared in Examples 1 to 3 and Comparative Examples 1 and 2, a conductive material, and a binder were mixed with each other at a ratio of 95:1:4 in distilled water, thereby preparing slurry. Here, as the conductive material, carbon black (super-P) was used, and as the binder, sodium carboxymethyl cellulose and styrene butadiene rubber were used at a ratio of 1:1.

The slurry was uniformly applied onto copper foil, dried in an oven at 80° C. for about 2 hours, and then, roll-pressed with a thickness of 50 μm and additionally dried in a vacuum oven at 110° C. for about 12 hours, thereby preparing an anode plate.

A CR2016 coin type half cell was manufactured by a manufacturing process generally known in the art using the manufactured anode plate, lithium foil as a counter electrode, a porous polyethylene film as a separator, and a liquid electrolyte in which LiPF6 was dissolved at a content of 1.3 M in a mixed solvent obtained by mixing ethylene carbonate and diethyl carbonate (DEC) at a volume ratio of 3:7 and 10 wt % of fluoro-ethyelene carbonate (FEC) was contained.

Table 1 illustrates results obtained by measuring initial charge and discharge capacity of the half cells in Examples 4 to 6 and Comparative Examples 3 and 4.

A specific surface area increase rate in Table 1 was measured using a BET analyzer (model name: TriStar II, manufactured by Micromeritics), and means a degree of increase in specific surface area after the carbon coating layer was formed as compared to a specific surface area of the graphite particles used in the each of the anode active materials adopted in Examples and Comparative Examples.

More specifically, in Examples 4 to 6, the specific surface area increase rate means a degree of increase in specific surface area in a state in which the first carbon coating layer was formed on the graphite particles as compared to a specific surface area of the graphite particles of Examples 1 to 3, in Comparative Example 3, since in the anode active material of Comparative Example 1, there was no carbon coating layer on the graphite, the increase rate was 0%, and in Comparative Example 4, the specific surface area increase rate means a degree of increase in a specific surface area in a state in which the first carbon coating layer having no pores was formed on the graphite particles as compared to a specific surface area of the graphite particles of Comparative Example 2.

As illustrated in Table 1, it may be appreciated that the anode active material according to the present invention exhibits a discharge capacity of 600 mAh/g or more and excellent initial efficiency characteristics of 85% or more to have more excellent initial discharge capacity characteristics and initial efficiency as those in Comparative Examples 3 and 4.

TABLE 1

| Classification | Initial Discharge Capacity (mAh/g) | Initial Efficiency (%) | Specific Surface Area Increase Rate (%) | $D_a/D_b$ |
| --- | --- | --- | --- | --- |
| Example 4 | 660 | 88.7 | 104 | 0.0125 |
| Example 5 | 658 | 87.8 | 150 | 0.0075 |
| Example 6 | 653 | 87.6 | 54 | 0.0175 |
| Comparative Example 3 | 582 | 81.1 | 0 | — |
| Comparative Example 4 | 575 | 79.6 | 43 | — |

In Table 1, $D_a$ is the average pore size of the pores of the first carbon coating layer of the anode active material, and $D_b$ is the average particle size of the carbon based particles.

Table 2 illustrates date obtained by evaluating cycle life characteristics of each of the half cells in Examples 4 to 6 and Comparative Examples 3 and 4.

TABLE 2

| Classification | Capacity Retention rate (%) After 50 Cycles | Specific Surface Area Increase Rate (%) | $D_a/D_b$ |
| --- | --- | --- | --- |
| Example 4 | 92.8 | 104 | 0.0125 |
| Example 5 | 89.7 | 150 | 0.0075 |
| Example 6 | 88.8 | 54 | 0.0175 |
| Comparative Example 3 | 78.2 | 0 | — |
| Comparative Example 4 | 77.1 | 43 | — |

In Table 2, $D_a$ is the average pore size of the pores of the first carbon coating layer of the anode active material, and $D_b$ is the average particle size of the carbon based particles.

Referring to Table 2, it may be appreciated that in Examples 4 to 6, even though charge and discharge were repeated, a decrease in capacity was small, and improve cycle life characteristics were exhibited.

It may be confirmed that in Comparative Example 3 in which the first carbon coating layer on the graphite particles was not included or in Comparative Example 4 in which the first carbon coating layer was included, but there was no pores in the first carbon coating layer, cycle life characteristics were deteriorated as compared to Examples.

Meanwhile, in Example 4 in which an average pore size of the pores of the first carbon coating layer was 200 nm or more to 300 nm or less, and $D_a/D_b$ was 0.01 or more to 0.015 or less, significantly excellent cycle life characteristics of 90% or more were exhibited.

In Example 5 in which the average pore size of the pores of the first carbon coating layer was relatively small, it is presumed that a ratio of the silicon coating layer filling in an internal space of the first carbon coating layer was increased, such that an effect of decreasing stress caused by charging and discharging was relatively small, and thus, a capacity loss due to volume expansion and delamination was partially generated.

In Example 6 the average pore size of the pores of the first carbon coating layer was relatively large, it is presumed that there was a portion in which the silicon coating layer was not firmly coated on the surface of the first carbon coating layer, such that a capacity loss was partially generated due to volume expansion caused by charging and discharging and a loss of silicon caused by delamination.

The anode active material according to the aspect of the present invention may decrease stress applied to the silicon coating layer due to volume expansion of the silicon coating layer occurring at the time of charging and discharging of the battery by containing the silicon coating layer having a thin thickness while have high capacity characteristics by containing a high content of silicon. Therefore, cycle life characteristics of the lithium secondary battery adopting the anode active material may be improved.

Further, the anode active material according to the aspect of the present invention may effectively prevent the electrical isolation phenomenon, the delamination phenomenon, and the like, occurring due to volume expansion of the silicon coating layer at the time charge and discharge of the battery. In addition, occurrence of the side reaction with the electrolyte and exhaustion of the electrolyte may be suppressed by blocking a silicon interface from being directly exposed to the electrolyte. Therefore, cycle life characteristics of the lithium secondary battery adopting the anode active material may be improved.

With the method of preparing an anode active material for a lithium secondary battery according to the aspect of the present invention, a large amount of silicon may be deposited on the graphite particles with a thin thickness, thereby making it possible to prepare the anode active material having the above-mentioned advantages.

The lithium secondary battery according to the aspect of the present invention contains the anode active material for a lithium secondary battery according to the aspect of the present invention, thereby making it possible to exhibiting excellent discharge capacity and cycle life characteristics.

What is claimed is:

1. An anode active material for a lithium secondary battery, the anode active material comprising:
   a carbon/silicon composite comprising:
   a carbon based particle;
   a first carbon coating layer positioned on and in contact with the carbon based particle the first carbon coating layer including pores;
   a silicon coating layer positioned on and in contact with the first carbon coating layer; and
   wherein the anode active material further comprises a second carbon coating layer positioned on the carbon/silicon composite, and
   wherein the first carbon coating layer is formed from a carbon precursor which is different from the carbon based particle.

2. The anode active material of claim 1, wherein the silicon coating layer is positioned on the pores or a pore-free surface of the first carbon coating layer.

3. The anode active material of claim 1, wherein the first carbon coating layer includes the pores in an interior and a surface thereof.

4. The anode active material of claim 1, wherein an average pore size of the pores of the first carbon coating layer is 30 nm or more to 900 nm or less.

5. The anode active material of claim 1, wherein the anode active material satisfies the following Equation 1:

$$0.005 \leq D_a/D_b \leq 0.02 \qquad \text{[Equation 1]}$$

in Equation 1, Da is an average pore size of the pores of the first carbon coating layer, and Db is an average particle size of the carbon based particle.

6. The anode active material of claim 1, wherein the carbon based particle is relatively nonporous compared to the first carbon coating layer and wherein a specific surface area when the first carbon coating layer is formed on the carbon based particle is increased by over 43% as compared to a specific surface area of only the carbon based particle due to the pores of the first carbon coating layer.

7. The anode active material of claim 1, wherein a thickness of the silicon coating layer is 10 nm or more to 100 nm or less.

8. The anode active material of claim 1, wherein the silicon coating layer is formed by a chemical vapor deposition (CVD) method.

9. The anode active material of claim 1, wherein the anode active material contains 30 wt % or more to 80 wt % or less of the carbon based particle, 5 wt % or more to 30 wt % or less of the first carbon coating layer, 5 wt % or more to 40 wt % or less of the silicon coating layer, and 5 wt % or more to 30 wt % or less of the second carbon coating layer based on a total weight of the anode active material.

10. A lithium secondary battery comprising the anode active material of claim 1.

11. The anode active material of claim 1, wherein a thickness of the first carbon coating layer is 0.01 μm or more to 10 μm or less.

12. The anode active material of claim 1, wherein a thickness of the silicon coating layer is 10 nm or more to 80 nm or less.

* * * * *